(12) United States Patent
Hofmann et al.

(10) Patent No.: US 11,548,549 B2
(45) Date of Patent: Jan. 10, 2023

(54) STEERING SYSTEM AND METHOD FOR OPERATING A STEERING SYSTEM

(71) Applicant: Robert Bosch Automotive Steering GmbH, Schwäbisch Gmünd (DE)

(72) Inventors: Falk Hofmann, Bühlerzell (DE); Michael Haegele, Aalen (DE); Kai Eckmann, Mutlangen (DE)

(73) Assignee: Robert Bosch Automotive Steering GmbH, Schwäbisch Gmünd (DE)

( * ) Notice: Subject to any disclaimer, the term of this patent is extended or adjusted under 35 U.S.C. 154(b) by 1270 days.

(21) Appl. No.: 15/777,567

(22) PCT Filed: Oct. 4, 2016

(86) PCT No.: PCT/EP2016/073613
§ 371 (c)(1),
(2) Date: May 18, 2018

(87) PCT Pub. No.: WO2017/084799
PCT Pub. Date: May 26, 2017

(65) Prior Publication Data
US 2021/0197891 A1 Jul. 1, 2021

(30) Foreign Application Priority Data
Nov. 20, 2015 (DE) .................... 10 2015 120 131.3

(51) Int. Cl.
*B62D 5/12* (2006.01)
*B62D 5/06* (2006.01)
*B62D 7/14* (2006.01)
(52) U.S. Cl.
CPC .............. *B62D 5/12* (2013.01); *B62D 5/064* (2013.01); *B62D 7/144* (2013.01); *B62D 7/148* (2013.01)

(58) Field of Classification Search
CPC ...... B62D 7/144; B62D 15/021; B62D 5/064; B62D 5/065; B62D 5/081; B62D 5/12;
(Continued)

(56) References Cited

U.S. PATENT DOCUMENTS 5,147,007 A * 9/1992 Kahrs ...................... B62D 5/22
180/421
5,372,214 A * 12/1994 Haga ....................... B62D 5/065
180/422
(Continued)

FOREIGN PATENT DOCUMENTS

DE          44 14 161 C1      11/1995
DE          195 10 208 A1      9/1996
(Continued)

OTHER PUBLICATIONS

DE102012105976_Eckmann Full English Translation, retrieved from IP.com on Nov. 18, 2021 (Year: 2012).*
(Continued)

*Primary Examiner* — Paul N Dickson
*Assistant Examiner* — Caitlin Anne Miller
(74) *Attorney, Agent, or Firm* — Maginot, Moore & Beck LLP

(57) ABSTRACT

A steering system for a trailing axle of a motor vehicle includes an electric motor, a hydraulic pump, a first valve, and a working cylinder. The electric motor is configured to drive the hydraulic pump. The working cylinder has a central bore and a piston positioned in the working cylinder. The first valve is fluidically connected to the pump such that the first valve is configured to block flow between the central bore and the pump in response to pressure generated by the pump, and to release the flow in response to a non-pressurized state of the pump in order to divert hydraulic fluid from the working cylinder through the central bore via an adhe-
(Continued)

sion-driven movement of the piston into a central position in the central bore. A method includes operating a steering system for a trailing axle of a motor vehicle of this type.

13 Claims, 6 Drawing Sheets

(58) Field of Classification Search
CPC ............. B62D 7/14; F15B 2211/20561; F15B 11/0423
See application file for complete search history.

(56) References Cited

U.S. PATENT DOCUMENTS

| | | | | |
|---|---|---|---|---|
| 5,449,186 | A * | 9/1995 | Gerl | B62D 7/1572 180/404 |
| 6,851,507 | B2 * | 2/2005 | Kurata | B62D 5/065 180/422 |
| 7,325,645 | B2 * | 2/2008 | Sakaki | B62D 5/062 180/421 |
| 7,959,164 | B2 * | 6/2011 | Keane | B60G 17/0185 280/5.508 |
| 10,066,650 | B2 * | 9/2018 | Tanaka | F15B 7/006 |
| 10,370,027 | B2 * | 8/2019 | Eckmann | B62D 5/064 |
| 11,142,240 | B2 * | 10/2021 | Winkler | B62D 5/065 |
| 2006/0032696 | A1 * | 2/2006 | Phillips | B62D 6/08 180/417 |
| 2017/0327147 | A1 * | 11/2017 | Hofmann | B62D 7/148 |

FOREIGN PATENT DOCUMENTS

| | | |
|---|---|---|
| DE | 103 51482 A1 | 6/2005 |
| DE | 10 2006 008 436 A1 | 11/2007 |
| DE | 10 2012 105 976 A1 | 1/2014 |
| DE | 10 2012 107 177 A1 | 5/2014 |
| DE | 10 2014 117 054 A1 | 5/2016 |

OTHER PUBLICATIONS

International Search Report corresponding to PCT Application No. PCT/EP2016/073613, dated Feb. 17, 2017 (German and English language document) (5 pages).

* cited by examiner

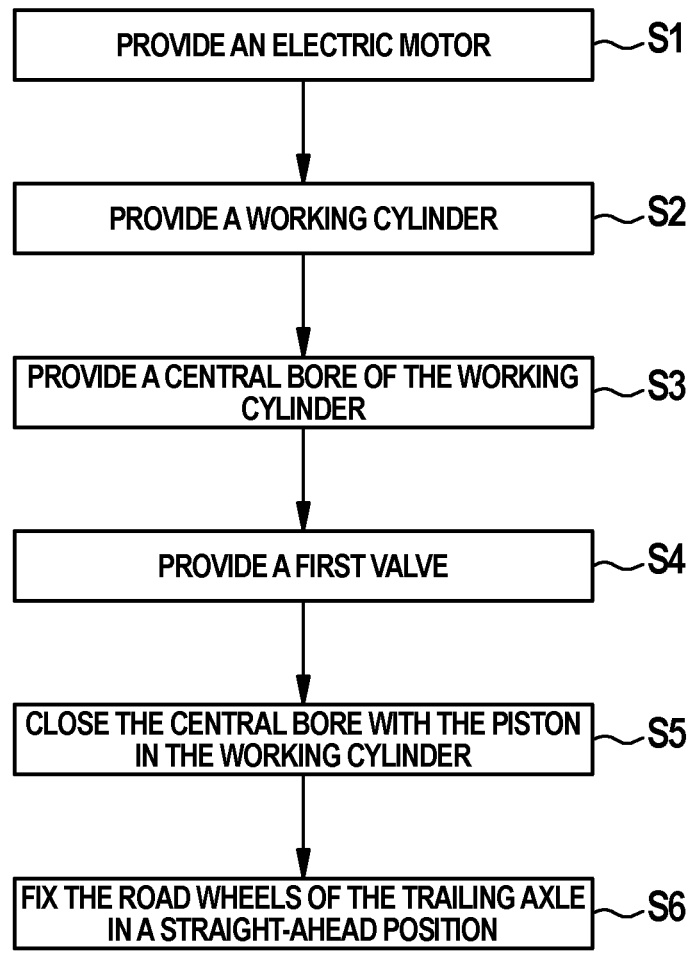

STEERING SYSTEM AND METHOD FOR OPERATING A STEERING SYSTEM

This application is a 35 U.S.C. § 371 National Stage Application of PCT/EP2016/073613, filed on Oct. 4, 2016, which claims the benefit of priority to Serial No. DE 10 2015 120 131.3, filed on Nov. 20, 2015 in Germany, the disclosures of which are incorporated herein by reference in their entirety.

The disclosure relates to a steering system for a trailing axle of a motor vehicle. The disclosure also relates to a method for operating a steering system for a trailing axle of a motor vehicle.

BACKGROUND

Heavy vehicles—in particular commercial vehicles—often have more than two axles, so-called trailing axles. If the trailing axles are formed rigidly, the vehicles have a large turning circle. Therefore, in addition to front axle steering, a steerable trailing axle is often additionally incorporated. The trailing axle in this case can be positively steered or adhesively steered, i.e. steered by the restoring movement of the wheels themselves. This additional trailing axle steering allows smaller curve radii, which means that greater maneuverability is achieved. In addition, the slip angle on the tires is reduced, which means that the tire wear of the vehicle is reduced.

However, active steering of the trailing axle is only desirable at low speeds. At higher vehicle speeds, no steering of the trailing axle is desired, since this has a detrimental influence on stable driving. The trailing axle must be fixed, starting at a specific speed dependent on the vehicle, in order not to cause any unstable driving condition. In such systems, it is advantageous that, in the event of a failure or at higher driving speeds, the axle can be kept in the straight-ahead position.

The prior art is that the trailing axle is steered via a hydraulic cylinder. The oil is pumped via a pump, which is driven via the internal combustion engine, into one or the other cylinder chamber, depending on how the valves are provided. Therefore, in particular when driving straight ahead, which the vehicle maintains for a long time, the hydraulic pump would be driven continuously although this is not necessary. In this operating state, the hydraulics generate losses, which are not countered by any added value. This is contrary to the requirement for a lower fuel consumption of the vehicle.

The problem is solved by the steering pump not being driven via the internal combustion engine but via an electric motor. Since the electric motor can drive equally in both directions, by using a reversible pump one or the other cylinder space can be pressurized, depending on the direction of rotation.

German patent DE 4414161 C1 describes a multi-axle steering system in which a master cylinder is activated. Depending on the position of the master cylinder on the front axle, the slave cylinder on the rear axle reacts. The disadvantage with this system, however, is the direct dependence on the respective position of the master cylinder. Thus, with this system, there is no possibility of exerting a speed-dependent influence on the rear axle.

DE 103 51 482 A1 shows a steering system in which a hydraulic steered vehicle rear axle having an additional blocking device is kept in the current position or steered back into a central position by adhesion steering and is then locked. However, this requires further components, needs additional installation space and is thus expensive.

DE 10 2006 008 436 A1 shows a mechanically coupled multi-axle steering system in which a steering force is only applied to the additional steering axle when the latter is also required to be active—that is to say when there is a steering angle. However, it is only with very great outlay that this system can be implemented for rear axle steering that is to be blocked when driving straight ahead from a certain speed range.

Finally, DE 10 2012 105 976 A1 discloses a steering system for a trailing axle having an electronic control system in which the steering of the trailing axle takes place independently of the front axle. The pump is driven via an electric motor, which means that the system operates in an energy-efficient manner. The blocking function is implemented in the simplest way in that, during the adhesion-driven return movement of the piston, hydraulic fluid is discharged from the working cylinder through a central bore. Once the piston reaches this central bore, it closes the latter and therefore blocks any further movement. Provided in the fluid connection between the central bore and the pump is a valve which, in the working position, suppresses a fluid flow there. In the event of a fault, the valve is de-energized and then allows a flow of fluid. This valve is configured as a spool valve.

Summary

The disclosure is consequently based on the object of providing an improved steering system and an improved method for operating a steering system that prevent a flow of fluid through the central bore as soon as the pump builds up fluid pressure and in a pressureless state of the pump dependably opens the valve automatically and allows a sufficient volumetric flow via the central bore.

The object is achieved by a steering system for a trailing axle of a motor vehicle according to this disclosure. The object is also achieved by a method for operating a steering system for a trailing axle of a motor vehicle according to this disclosure.

The present disclosure provides a steering system for a trailing axle of a motor vehicle, a first valve being fluidically connected to a pump in such a way that it blocks a flow of fluid between a central bore of a working cylinder and the pump when pressure is generated by the pump, and releases a flow of fluid between the central bore of the working cylinder and the pump in a pressureless state of the pump for discharging hydraulic fluid from the working cylinder via the central bore of the working cylinder by an adhesion-driven return movement of a piston arranged in the working cylinder into a central position.

The present disclosure also provides a method for operating a steering system for a trailing axle of a motor vehicle, a first valve being fluidically connected to a pump in such a way that it blocks a flow of fluid between a central bore of a working cylinder and the pump when pressure is generated by the pump, and releases a flow of fluid between the central bore of the working cylinder and the pump in a pressureless state of the pump for discharging hydraulic fluid from the working cylinder via the central bore of the working cylinder by an adhesion-driven return movement of a piston arranged in the working cylinder into a central position.

One idea of the present disclosure is to provide an improved steering system and an improved method for operating a steering system that prevent a flow of fluid through the central bore as soon as the pump builds up fluid pressure and in a pressureless state of the pump dependably opens the valve automatically and allows a sufficient volumetric flow via the central bore. Furthermore, in an advantageous way, few components are used because of the use of the hydraulically activatable valve, since no additional electrical signal lines or electrical activating means are required for operating the valve. The provision of the hydraulically activatable valve between the central bore of the working cylinder and the pump has furthermore the advantage that, by contrast with known solutions, it does not have any electrical energy consumption. In this way, an energy saving can be achieved.

Advantageous embodiments and developments are provided by the claims and also the description with reference to the figures.

According to a preferred development, it is provided that the first valve can be pressurized with fluid pressure via a second valve, which is designed as a shuttle valve, the second valve being connected to a first hydraulic line, arranged between the pump and a first connection of the working cylinder, and to a second hydraulic line, arranged between the pump and a second connection of the working cylinder. Consequently, in an advantageous way, the shuttle valve can be pressurized through a fluid pressure present in the first hydraulic line or a fluid pressure present in the second hydraulic line, depending on the direction of flow of the fluid.

According to a further preferred development, it is provided that the second valve has an element which is axially movable between a first sealing seat and a second sealing seat, the element closing the first sealing seat or the second sealing seat, depending on the direction of fluid flow, and pressurizing the first valve with a fluid pressure. Consequently, in an advantageous way, the element only ever closes one sealing seat, and can therefore always provide a pump pressure to the first valve, as long as the pump is in operation.

According to a further preferred development, it is provided that the first valve can be pressurized with fluid pressure by a third valve and a fourth valve, which are designed as check valves, the third valve being connected to a first hydraulic line, arranged between the pump and a first connection of the working cylinder, and the fourth valve being connected to a second hydraulic line, arranged between the pump and a second connection of the working cylinder. Consequently, in an advantageous way, the first valve can be pressurized with fluid pressure via the third valve when a fluid pressure is present in the first hydraulic line and can be pressurized with fluid pressure via the fourth valve in the case where a fluid pressure is present in the second hydraulic line. On account of the use of check valves, a flow of fluid is in each case only possible in one direction of flow, i.e. when there is a flow of fluid through the third valve, the fourth valve is in a blocked position and, when there is a flow of fluid through the fourth valve, the third valve is in a blocked position. Consequently, in an advantageous way, a return flow from the first hydraulic line into the second hydraulic line, and vice versa, past the first valve can be prevented.

According to a further preferred development, it is provided that a fifth valve, which is provided in series with the first valve, is arranged between the central bore and the pump, the first valve being connected to a first hydraulic line, arranged between the pump and a first connection of the working cylinder, and the fifth valve being connected to a second hydraulic line, arranged between the pump and a second connection of the working cylinder. On account of the connection of the first valve to the first hydraulic line and the fifth valve to the second hydraulic line, it is ensured that, irrespective of the direction of flow of the hydraulic fluid, the first valve or the fifth valve is closed when pressure is generated by the pump, and as a result an outflow of hydraulic fluid from the working cylinder via the central bore is prevented. In a pressureless state of the pump, the first valve and the fifth valve are preferably both open, and consequently allow the outflow of hydraulic fluid from the working cylinder via the central bore.

According to a further preferred development, it is provided that the first valve and the fifth valve are designed as seat valves, a valve piston of the first valve and a valve piston of the fifth valve being transferable into a basic position by a compression spring. Consequently, it can be made possible in a dependable and reliable way that the respective valve is open in a pressureless state of the pump and is closed when there is a pressure.

According to a further preferred development, it is provided that the first valve is designed as a 2 port/3-position valve, which is connected at a first connection to a first hydraulic line, arranged between the pump and a first connection of the working cylinder, and is connected at a second connection to a second hydraulic line, arranged between the pump and a second connection of the working cylinder. By using the 2 port/3-position valve, it is likewise ensured that the 2 port/3-position valve is closed when there is a fluid pressure in the first hydraulic line or when there is a fluid pressure in the second hydraulic line and is open in a pressureless state of the pump. By using the 2 port/3-position valve, it can be made possible in an advantageous way that both hydraulic lines are connectable to only one valve.

According to a further preferred development, it is provided that a fluid tank is arranged between the first valve and the pump, the fluid tank being connected to the pump and/or the first hydraulic line and the second hydraulic line, and at least one first filter and a first feeder valve being arranged between the fluid tank and the first hydraulic line and at least one second filter and a second feeder valve being arranged between the fluid tank and the second hydraulic line. Consequently, it can be ensured in an advantageous way that, when hydraulic fluid is removed from the working cylinder via the central bore, the hydraulic fluid first passes into the fluid tank and following that can be delivered into the first hydraulic line or the second hydraulic line.

According to a further preferred development, it is provided that the first valve is preceded by an orifice plate, by which a volumetric flow of the fluid from the central bore to the fluid tank is variable in the open state of the first valve. The stream of fluid flowing from the central bore to the fluid tank is consequently adaptable to respective requirements. For example, in this way a resetting speed of the road wheels of the trailing axle can be varied.

According to a further preferred development, it is provided that the pump is designed as a reversible pump. Consequently, the steering system for the trailing axle of the motor vehicle can in an advantageous way be operated with only one hydraulic pump.

The described configurations and developments can be combined with one another as desired.

Further possible configurations, developments and implementations of the disclosure also comprise not explicitly mentioned combinations of features of the disclosure that are described above or below with respect to the exemplary embodiments.

BRIEF DESCRIPTION OF THE DRAWINGS

The accompanying drawings are intended to convey further understanding of the embodiments of the disclosure.

They illustrate embodiments and serve in conjunction with the description for explaining principles and concepts of the disclosure.

Figure 1:
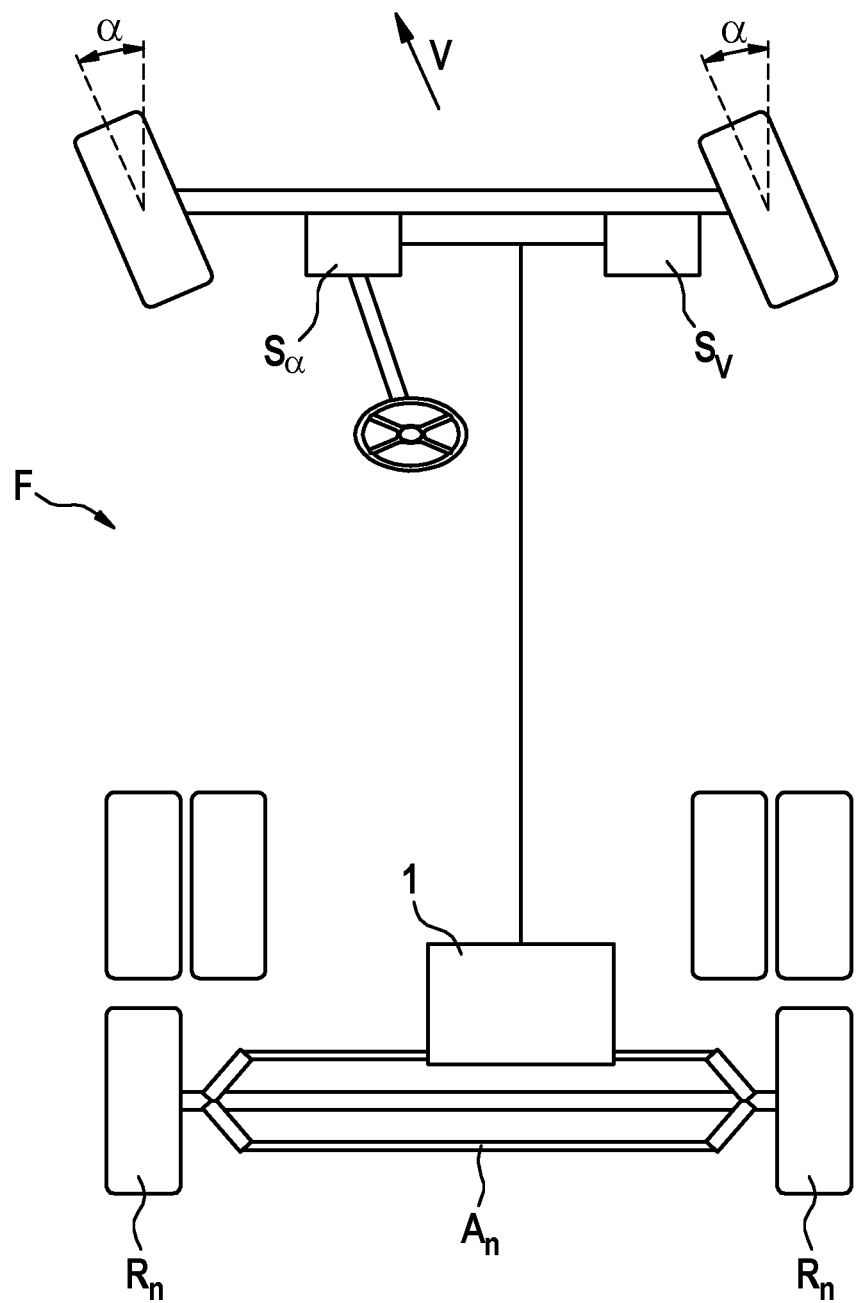

Other embodiments and many of the advantages mentioned are evident from the drawings. The elements of the drawings that are shown are not necessarily to scale in relation to one another.

Figure 2:
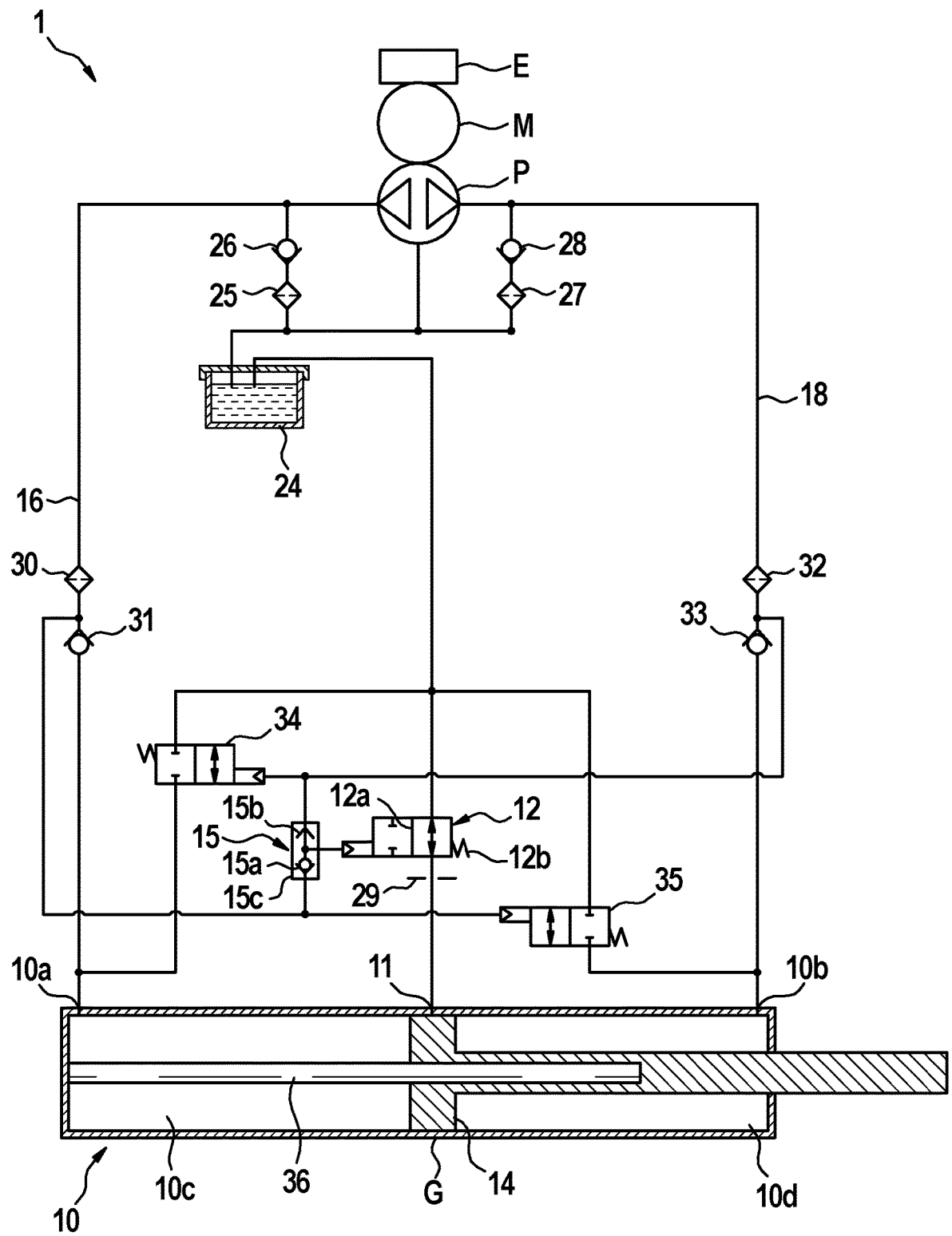
Figure 3:
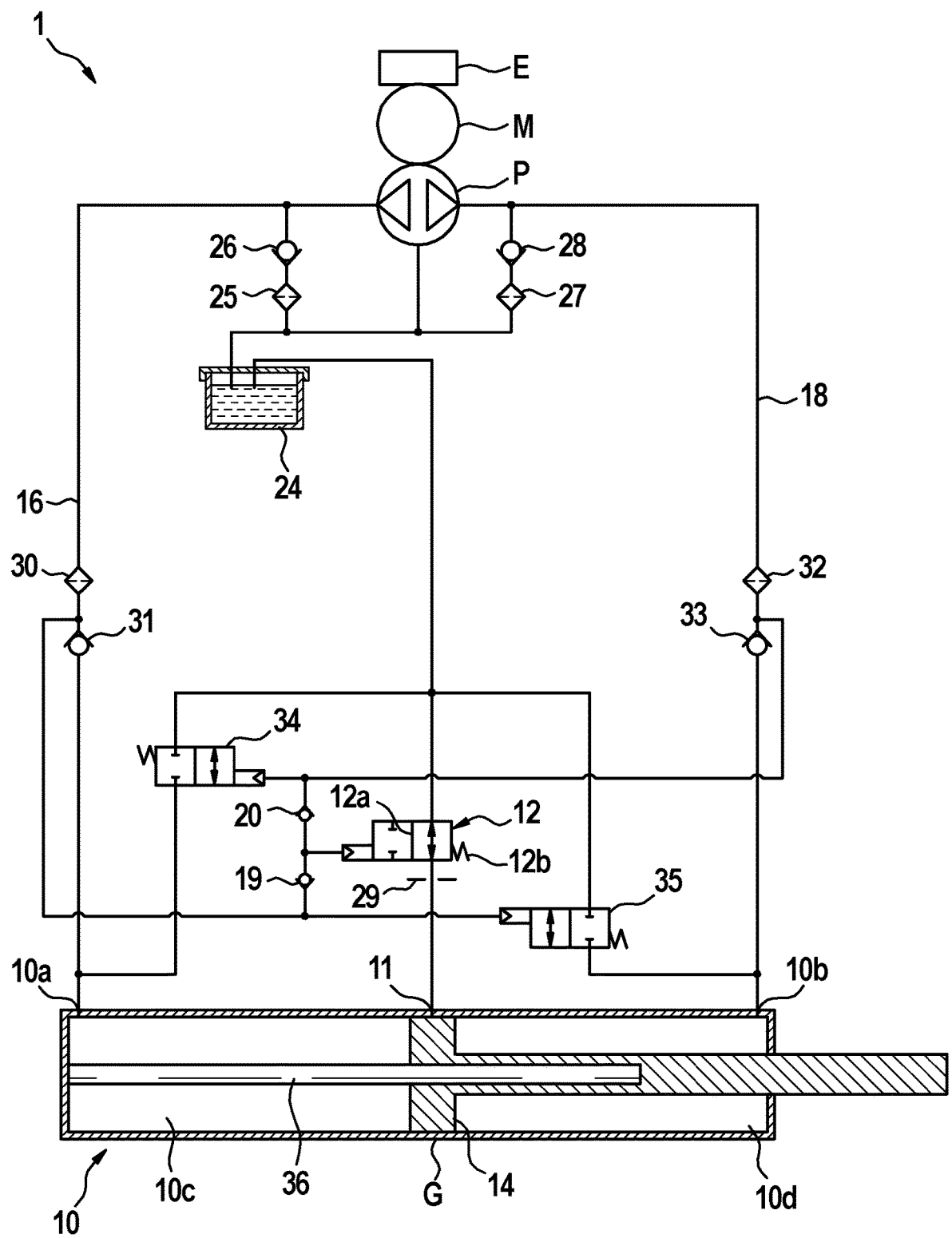
Figure 4:
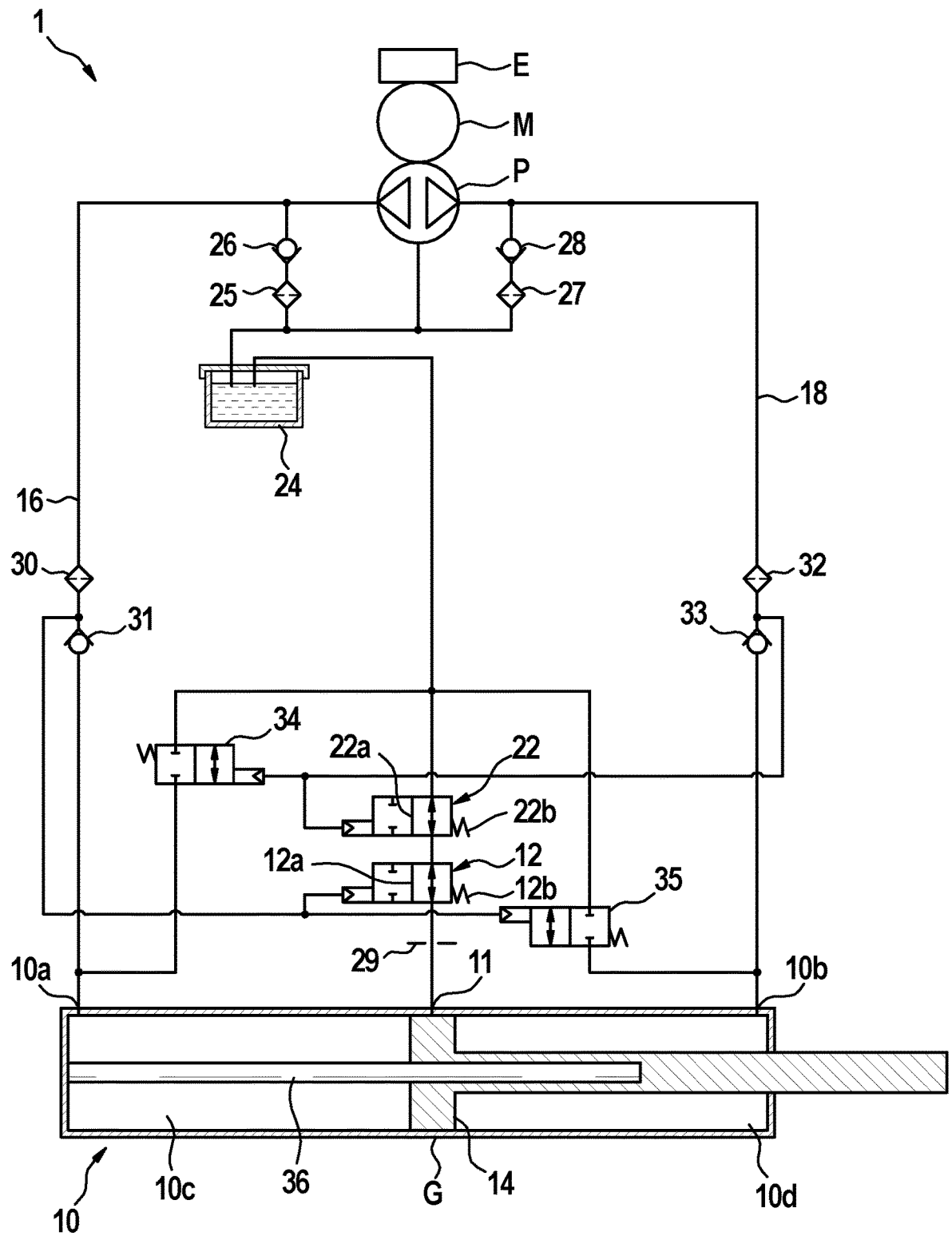
Figure 5:
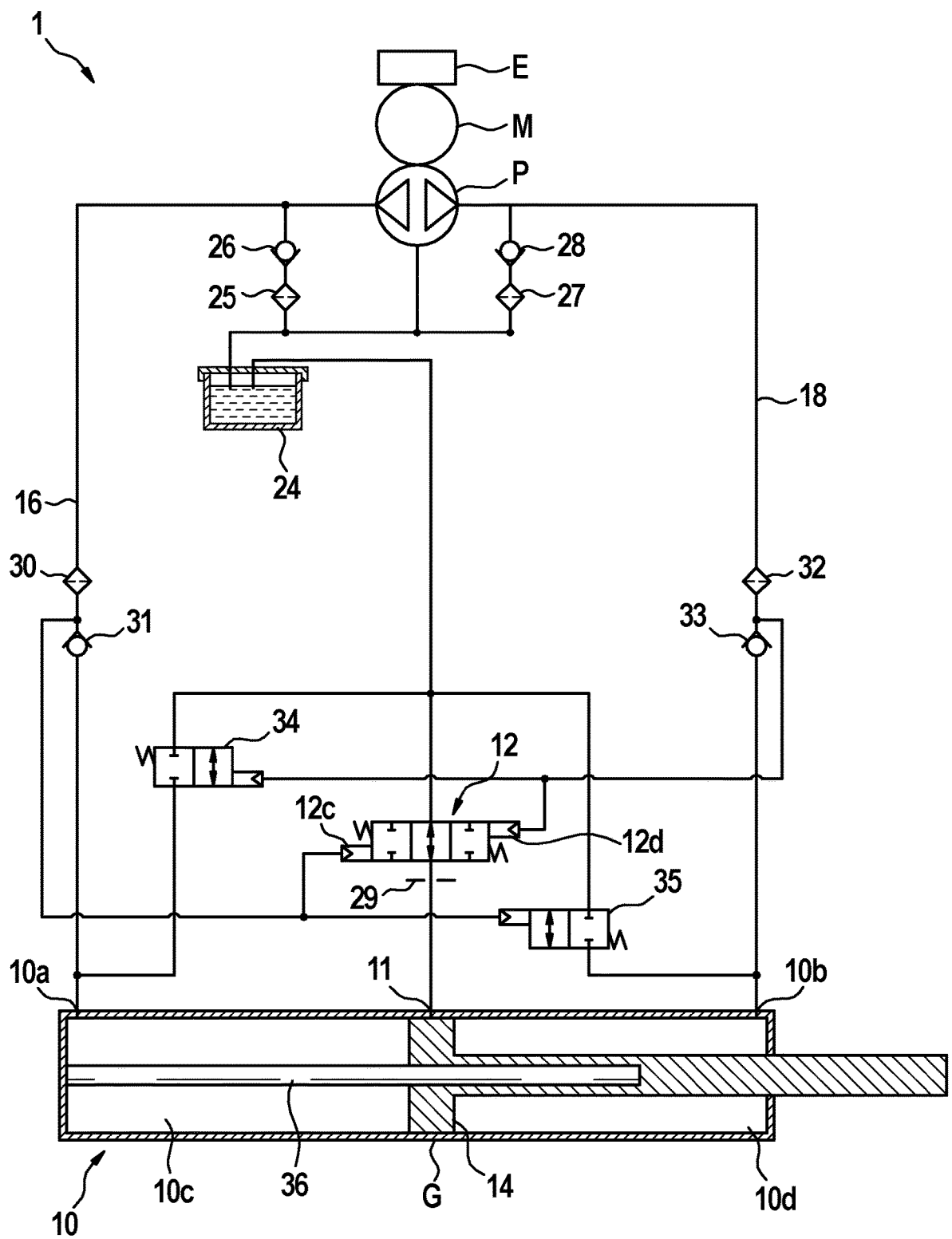

In the drawings:

FIG. 1 shows a schematic representation of a motor vehicle with a steering system for a trailing axle according to a first embodiment of the disclosure;

FIG. 2 shows a hydraulic diagram of the steering system for the trailing axle of the motor vehicle according to the first embodiment of the disclosure;

FIG. 3 shows a hydraulic diagram of the steering system for the trailing axle of the motor vehicle according to a second embodiment of the disclosure;

FIG. 4 shows a hydraulic diagram of the steering system for the trailing axle of the motor vehicle according to a third embodiment of the disclosure;

FIG. 5 shows a hydraulic diagram of the steering system for the trailing axle of the motor vehicle according to a fourth embodiment of the disclosure; and FIG. 6 shows a flow diagram of a method for operating the steering system for the trailing axle of the motor vehicle according to the first to fourth embodiments of the disclosure.

DETAILED DESCRIPTION

Unless anything to the contrary is stated, in the figures of the drawings the same designations denote elements, components or items that are the same or functionally the same.

FIG. 1 shows a schematic representation of a motor vehicle F with a steering system 1 for a trailing axle $A_n$ according to a first embodiment of the disclosure.

The motor vehicle F has in an advantageous way the steering system 1 for the trailing axle $A_n$ of the motor vehicle F. For detecting a steering angle α of road wheels $R_n$ on a front axle $A_v$, a steering angle sensor $F_\alpha$ is provided. For detecting a driving speed v of the motor vehicle F, a driving speed sensor $S_v$ is provided. The signals thereof are transmitted via a signal line (not shown in FIG. 1) to the steering system 1 of the trailing axle $A_n$ of the motor vehicle F. In particular, the signals are transmitted to a control unit (not shown in FIG. 1), which is designed for activating an electric motor (not shown in FIG. 1) and a reversible hydraulic pump that is operated therewith. The control unit is furthermore connected to a linear sensor (not shown in FIG. 1) of a working cylinder, which can move the road wheels $R_n$ of the trailing axle $A_n$ of the motor vehicle F in a defined caster angle.

FIG. 2 shows a hydraulic diagram of the steering system 1 for the trailing axle $A_n$ of the motor vehicle F according to the first embodiment of the disclosure.

The data determined by the steering angle sensor and driving speed sensor (not shown in FIG. 2) are transmitted to the control unit E. The control unit E calculates from the data a caster angle of the road wheels on the trailing axle of the motor vehicle and activates an electric motor M correspondingly.

The electric motor M serves for driving a hydraulic pump P, which in turn is connected to the working cylinder 10 for pivoting the road wheels of the trailing axle. The working cylinder 10 has a central bore 11, via which hydraulic fluid can be removed from the working cylinder 10, so that a piston arranged in the working cylinder can be moved in an adhesion-driven manner into a central position, in which it closes the central bore, and the road wheels of the trailing axle are fixed in a straight-ahead position.

In the case of this electrohydraulic steering system, the pivoting of the trailing axle takes place independently of the front axle, since a steering wheel of the motor vehicle is not mechanically connected to the trailing axle to be steered. Moreover, this system is decoupled from the internal combustion engine, so that on the one hand closed-loop control appropriate for requirements and on the other hand great spatial flexibility when fitting the system—as a result of the small number of components, which also can be placed freely—are ensured. At low speeds and at a standstill, active steering dependent on the steering angle of the front axle and on the driving speed is possible with this system. In particular, the road wheels of the trailing axle can also be brought out of any deflection angle into their straight-ahead position, and can be reliably fixed there, automatically, i.e. in an adhesion-driven manner, at any time even if there is a failure of the control unit E, the electric motor M and/or the hydraulic pump P.

During the adhesion-driven movement of the piston of the working cylinder in the direction of the central bore, hydraulic fluid is discharged for example from a first cylinder space 10c in the direction of a fluid tank, while in a second cylinder space 10d without the use of a pump—replenishing fluid is fed in. As soon as the central bore is closed by the piston, further movement of it is blocked by the hydraulic fluid confined as it were on both sides, so that the wheels of the trailing axle are dependably fixed in their straight-ahead position.

A trailing axle is intended to be understood here as meaning any axle which follows a deflection of a steered axle and which can be arranged to trail or lead a rigid rear or front axle, that is to say also as a leading axle. The steering system according to the disclosure can therefore also be used in the case of trailers, semitrailers or a second steered front axle.

During normal operation of the steering system 1, the pump P draws via a first feeder valve 26, which is provided between a fluid tank 24 and a first hydraulic line 16, arranged between the pump P and a first connection 10a of the working cylinder 10. Preferably arranged between the fluid tank 24 and the first feeder valve 26 is a first filter 25, in order to filter contaminants that are possibly present in the fluid tank 24.

During normal operation of the steering system 1, the pump P draws via a second feeder valve 28, which is provided between the fluid tank 24 and a second hydraulic line 18, arranged between the pump P and a second connection 10b of the working cylinder 10. Preferably arranged between the fluid tank 24 and the second feeder valve 28 is a second filter 27, in order to filter contaminants that are possibly present in the fluid tank 24.

During a steering operation, the pump P delivers hydraulic fluid into the first cylinder space 10c, for example via the first hydraulic line 16 through a filter 30 and a check valve 31. Alternatively, the pump P may for example deliver hydraulic fluid into a second cylinder space 10d, via the second hydraulic line 18 through a filter 32 and a check valve 33.

Assigned to the first cylinder space 10c is a return flow valve 34, which is closed during filling of the first cylinder space 10c. As a result of a pressure buildup in the first cylinder space 10c, a return flow valve 35 of the second cylinder space 10*d* is opened and, as a result, a return flow from the second cylinder space 10*d* into the fluid tank 24 is made possible.

The second cylinder space 10*d* is assigned a return flow valve 35, which is closed during filling of the second cylinder space 10*d*. As a result of a pressure buildup in the second cylinder space 10*d*, the return flow valve 34 of the first cylinder space 10*c* is opened and, as a result, a return flow from the first cylinder space 10*c* into the fluid tank 24 is made possible.

A first valve 12 is preferably provided in a fluid connection between the central bore 11 of the working cylinder 10 and the pump P. The first valve 12 is preferably fluidically connected to the pump P in such a way that it blocks a flow of fluid between the central bore 11 of the working cylinder 10 and the pump P when pressure is generated by the pump P. In a pressureless state of the pump P, the first valve 12 preferably releases a flow of fluid between the central bore 11 of the working cylinder 10 and the pump P. As a result, in an advantageous way hydraulic fluid from the working cylinder 10 via the central bore 11 of the working cylinder 10 can take place by an adhesion-driven return movement of the piston 14 arranged in the working cylinder 10 into a central position G.

The various operating states are described below.

Driving Straight Ahead, Higher Driving Speed

When driving straight ahead at a higher driving speed, the trailing axle is not pivoted, but must be kept in the straight-ahead position. Since, when driving straight ahead, the pump P does not generate any pressure, the first valve 12 is not pressurized with a fluid pressure and is consequently open. Therefore, in the event of an angled position of the road wheels, hydraulic fluid can escape from the working cylinder 10 into the fluid tank 24 via the central bore 11. When the piston 14 reaches the central position G in the working cylinder 10, it is advantageously fixed and the road wheels are kept in the straight-ahead position.

Active Steering, Low Driving Speed

In the case of active steering, a steering angle of the front axle is detected by measuring instruments and transmitted to the control unit E of the steering system 1. With these and further parameters, such as for example the driving speed, a desired value of an angular position of the road wheels of the trailing axle is calculated and the electric motor M is activated by the control unit E. A$_n$ actual value is detected by way of a position sensor 36, arranged in the working cylinder 10, and is used for the control.

In the present embodiment, the first valve 12 can be pressurized with fluid pressure via a second valve 15, which is designed as a shuttle valve. The second valve 15 is connected to a first hydraulic line 16, arranged between the pump P and the first connection 10*a* of the working cylinder 10. Furthermore, the second valve 15 is connected to the second hydraulic line 18, arranged between the pump P and the second connection 10*b* of the working cylinder 10.

The second valve 15 preferably has an element 15*a*, which is axially movable between a first sealing seat 15*b* and a second sealing seat 15*c*. The element 15*a* preferably closes the first sealing seat 15*b* or the second sealing seat 15*c*, depending on the direction of fluid flow, and pressurizes the first valve 12 with a fluid pressure. The element 15*a* is preferably designed as a sphere. Alternatively, the element 15*a* may be of some other suitable form.

If, for example, the pump P delivers a volumetric flow of the hydraulic fluid via the first hydraulic line 16, the second valve 15 is actuated and passes on a pump pressure to the first valve 12. At the same time, the second valve 15 prevents a volumetric flow of the hydraulic fluid to the second hydraulic line 18. The pump pressure that is present has the effect of actuating the first valve 12 and closing a connecting line between the central bore 11 and the fluid tank 24. Consequently, a loss of volumetric flow via the central bore 11 is prevented. As soon as the road wheels of the trailing axle have reached a predetermined desired position, the pump P is no longer driven and a fluid pressure in the first hydraulic line 16 drops, which has the consequence that the first valve 12 opens again. If there are deviations between desired and actual values, the steering system 1 makes adjustments, whereby the pump P builds up the required pressure, whereby the first valve 12 is closed again and a steering correction is performed.

Failure of the Steering System

If there is a failure of the steering system, a pump pressure previously built up during active steering drops. As a result, the first valve 12 assumes its basic position and connects the central bore 11 of the working cylinder 10 to the fluid tank 24, whereby the return of the axle is made possible.

The first valve 12 is preferably additionally preceded by an orifice plate 29, by which a volumetric flow of the fluid from the central bore 11 to the fluid tank 24 is variable in the open state of the first valve 12. Consequently, a through-flow cross section can be varied, whereby a return speed of the trailing axle can be set. In addition, the pump P is preferably designed as a reversible pump.

FIG. 3 shows a hydraulic diagram of the steering system 1 for the trailing axle A$_n$ of the motor vehicle F according to a second embodiment of the disclosure.

The first valve 12 is preferably able to be pressurized with fluid pressure via a third valve 19 and a fourth valve 20, which are designed as check valves. The third valve 19 is preferably connected to the first hydraulic line 16, arranged between the pump P and the first connection 10*a* of the working cylinder 10. The fourth valve 20 is preferably connected to the second hydraulic line 18, arranged between the pump P and the second connection 10*b* of the working cylinder 10.

FIG. 4 shows a hydraulic diagram of the steering system 1 for the trailing axle A$_n$ of the motor vehicle F according to a third embodiment of the disclosure.

Preferably arranged between the central bore 11 of the working cylinder 10 and the pump P is a fifth valve 22, which is provided in series with the first valve 12. The first valve 12 is preferably connected to the first hydraulic line 16, arranged between the pump P and the first connection 10*a* of the working cylinder 10. The fifth valve 22 is preferably connected to the second hydraulic line 18, arranged between the pump P and the second connection 10*b* of the working cylinder 10.

The first valve 12 and the fifth valve 22 are preferably designed as seat valves. A valve piston 12*a* of the first valve 12 and a valve piston 22*a* of the fifth valve are preferably transferable into a basic position by a respective compression spring 12*b*, 22*b*.

FIG. 5 shows a hydraulic diagram of the steering system 1 for the trailing axle A$_n$ of the motor vehicle F according to a fourth embodiment of the disclosure.

The first valve 12 is preferably designed as a 2 port/3-position valve. The 2 port/3-position valve is preferably connected at a first connection 12*c* to the first hydraulic line 16, arranged between the pump P and the first connection 10*a* of the working cylinder 10. Furthermore, the 2 port/3-position valve is connected at a second connection 12*d* to the second hydraulic line 18, arranged between the pump P and the second connection 10*b* of the working cylinder 10.

FIG. 6 shows a flow diagram of a method for operating the steering system for the trailing axle of the motor vehicle according to the first to fourth embodiments of the disclosure.

The method for operating the steering system for the trailing axle of the motor vehicle comprises providing S1 an electric motor for driving a hydraulic pump. Furthermore, the method comprises providing S2 a working cylinder connected to the pump for pivoting road wheels of the trailing axle. Moreover, the method comprises providing S3 a central bore of the working cylinder, which is fluidically connected to the pump. In addition, the method comprises providing S4 a first valve, which is provided in a fluid connection between the central bore and the pump, the first valve being fluidically connected to the pump in such a way that it blocks a flow of fluid between the central bore of the working cylinder and the pump when pressure is generated by the pump, and releases a flow of fluid between the central bore of the working cylinder and the pump in a pressureless state of the pump for discharging hydraulic fluid from the working cylinder via the central bore of the working cylinder by an adhesion-driven return movement of a piston arranged in the working cylinder into a central position.

The method comprises moreover closing S5 the central bore by the piston in the central position in the working cylinder. The method comprises furthermore fixing S6 the road wheels of the trailing axle in a straight-ahead position.

Although the present disclosure has been described above on the basis of preferred exemplary embodiments, it is not restricted to them but can be modified in various ways. In particular, the disclosure can be changed or modified in a variety of ways without departing from the essence of the disclosure.

For example, valves of a different type that perform the same function may be used.

LIST OF DESIGNATIONS

1 Steering system
10 Working cylinder
10a First connection
10b Second connection
10c First cylinder space
10d Second cylinder space
11 Central bore
12 Valve
12a, 22a Valve piston
12b, 22b Compression spring
12c First connection
12d Second connection
14 Piston
14 Second valve
15a Element
15b First sealing seat
15c Second sealing seat
16 First hydraulic line
18 Second hydraulic line
19 Third valve
20 Fourth valve
22 Fifth valve
24 Fluid tank
25 First filter
26 First feeder valve
27 Second filter
28 Second feeder valve
29 Orifice plate
30, 32 Filter
31, 33 Check valve
34 First return valve
35 Second return valve
36 Position sensor
$A_n$ Trailing axle
E Control unit
F Motor vehicle
$F_\alpha$ Steering angle
G Central position
M Electric motor
P Pump
Rn Road wheels of the trailing axle
$S_v$ Vehicle speed
V Vehicle speed
α Steering angle

The invention claimed is:

1. A steering system for a trailing axle of a motor vehicle, comprising:
    a working cylinder that is configured to pivot road wheels of a trailing axle of a motor vehicle, and that includes:
        a central bore; and
        a piston positioned in the working cylinder;
    a hydraulic pump connected to the working cylinder; and
    a first valve fluidically connected between the central bore and the hydraulic pump such that the first valve is configured to (i) block a flow of fluid between the central bore and the hydraulic pump in response to a pressure generated by the hydraulic pump, and (ii) release the flow of fluid in response to a pressureless state of the hydraulic pump in order to discharge hydraulic fluid from the working cylinder through the central bore via an adhesion-driven movement of the piston into a central position;
    an electric motor configured to drive the hydraulic pump; and
    a fluid tank fluidly connected between the first valve and the hydraulic pump so as to receive the hydraulic fluid discharged from the working cylinder through the first valve.

2. The steering system as claimed in claim 1, further comprising:
    a first hydraulic line connecting the hydraulic pump and a first connection of the working cylinder;
    a second hydraulic line connecting the hydraulic pump and a second connection of the working cylinder; and
    a second valve embodied as a shuttle valve and connected to the first hydraulic line and the second hydraulic line, the shuttle valve connected to the first valve to supply fluid pressure from the first hydraulic line or the second hydraulic line to the first valve so as to actuate the first valve with the fluid pressure.

3. A steering system for a trailing axle of a motor vehicle, comprising:
    a working cylinder that is configured to pivot road wheels of a trailing axle of a motor vehicle, and that includes:
        a central bore; and
        a piston positioned in the working cylinder;
    a hydraulic pump connected to the working cylinder; and
    a first valve fluidically connected between the central bore and the hydraulic pump such that the first valve is configured to (i) block a flow of fluid between the central bore and the hydraulic pump in response to a pressure generated by the hydraulic pump, and (ii) release the flow of fluid in response to a pressureless state of the hydraulic pump in order to discharge hydraulic fluid from the working cylinder through the central bore via an adhesion-driven movement of the piston into a central position;
an electric motor configured to drive the hydraulic pump;
a first hydraulic line positioned between the hydraulic pump and a first connection of the working cylinder;
a second hydraulic line positioned between the hydraulic pump and a second connection of the working cylinder; and
a second valve configured to pressurize the first valve with fluid pressure, the second valve embodied as a shuttle valve and connected to the first hydraulic line and the second hydraulic line, the second valve comprising:
a first sealing seat;
a second sealing seat; and
an element that is axially movable between the first sealing seat and the second sealing seat, and that is configured to (i) selectively close the first sealing seat and the second sealing seat, depending on a direction of fluid flow, and (ii) pressurize the first valve with the fluid pressure.

4. The steering system as claimed in claim 1, further comprising:
a first hydraulic line positioned between the hydraulic pump and a first connection of the working cylinder;
a second hydraulic line positioned between the hydraulic pump and a second connection of the working cylinder; and
a third valve and a fourth valve that are configured to pressurize the first valve with fluid pressure, the third and fourth valves embodied as check valves, the third valve connected to the first hydraulic line, and the fourth valve connected to the second hydraulic line.

5. The steering system as claimed in claim 1, further comprising:
a first hydraulic line positioned between the hydraulic pump and a first connection of the working cylinder;
a second hydraulic line positioned between the hydraulic pump and a second connection of the working cylinder; and
a fifth valve positioned in series with the first valve between the central bore and the hydraulic pump,
wherein the first valve is connected to the first hydraulic line and is actuated by fluid pressure from the first hydraulic line, and the fifth valve is connected to the second hydraulic line and is actuated by fluid pressure from the second hydraulic line.

6. The steering system as claimed in claim 5, wherein:
the first valve and the fifth valve are each embodied as seat valves; and
each of the first valve and the fifth valve includes:
a respective compression spring; and
a respective valve piston that is transferable into a basic position by the respective compression spring.

7. The steering system as claimed in claim 1, further comprising:
a first hydraulic line positioned between the hydraulic pump and a first connection of the working cylinder; and
a second hydraulic line positioned between the hydraulic pump and a second connection of the working cylinder;
wherein:
the first valve is embodied as a 2-port/3-position valve, and
the first valve has:
a first valve connection connected to the first hydraulic line such that fluid pressure in the first hydraulic line actuates the first valve in a first direction; and
a second valve connection connected to the second hydraulic line such that fluid pressure in the second hydraulic line actuates the first valve in a second opposite direction.

8. The steering system as claimed in claim 2, wherein:
the fluid tank is connected to the first hydraulic line and the second hydraulic line, and
the steering system further comprises:
at least one first filter positioned between the fluid tank and the first hydraulic line;
a first feeder valve positioned between the fluid tank and the first hydraulic line;
at least one second filter positioned between the fluid tank and the second hydraulic line; and
a second feeder valve positioned between the fluid tank and the second hydraulic line.

9. The steering system as claimed in claim 8, further comprising:
an orifice plate positioned upstream of the first valve between the central bore and the first valve and configured, in an open state of the first valve, to vary a volumetric flow of fluid from the central bore to the fluid tank.

10. The steering system as claimed in claim 1, wherein the hydraulic pump is embodied as a reversible pump.

11. A method for operating a steering system for a trailing axle of a motor vehicle, comprising:
blocking, via a first valve, a flow of fluid between a central bore of a working cylinder and a hydraulic pump in response to a pressure generated by the hydraulic pump, wherein the central bore of working cylinder is fluidically connected to the hydraulic pump, wherein the hydraulic pump is driven by an electric motor, and wherein the working cylinder is configured to pivot road wheels of a trailing axle; and
releasing the flow via the first valve in response to a pressureless state of the hydraulic pump, such that a piston positioned in the working cylinder undergoes an adhesion-driven return movement to a central position and causes hydraulic fluid to discharge from the working cylinder,
wherein the flow is released via the first valve to a fluid tank that is fluidly connected between the first valve and the hydraulic pump.

12. The method as claimed in claim 11, wherein, when the piston is in the central position, the piston closes the central bore, and the road wheels of the trailing axle are fixed in a straight-ahead position.

13. The steering system as claimed in claim 2, wherein the second valve includes:
a first sealing seat;
a second sealing seat; and
an element that is axially movable between the first sealing seat and the second sealing seat, and that is configured to (i) selectively close the first sealing seat and the second sealing seat, depending on a direction of fluid flow, and (ii) supply the first valve with the fluid pressure.

* * * * *